UNITED STATES PATENT OFFICE.

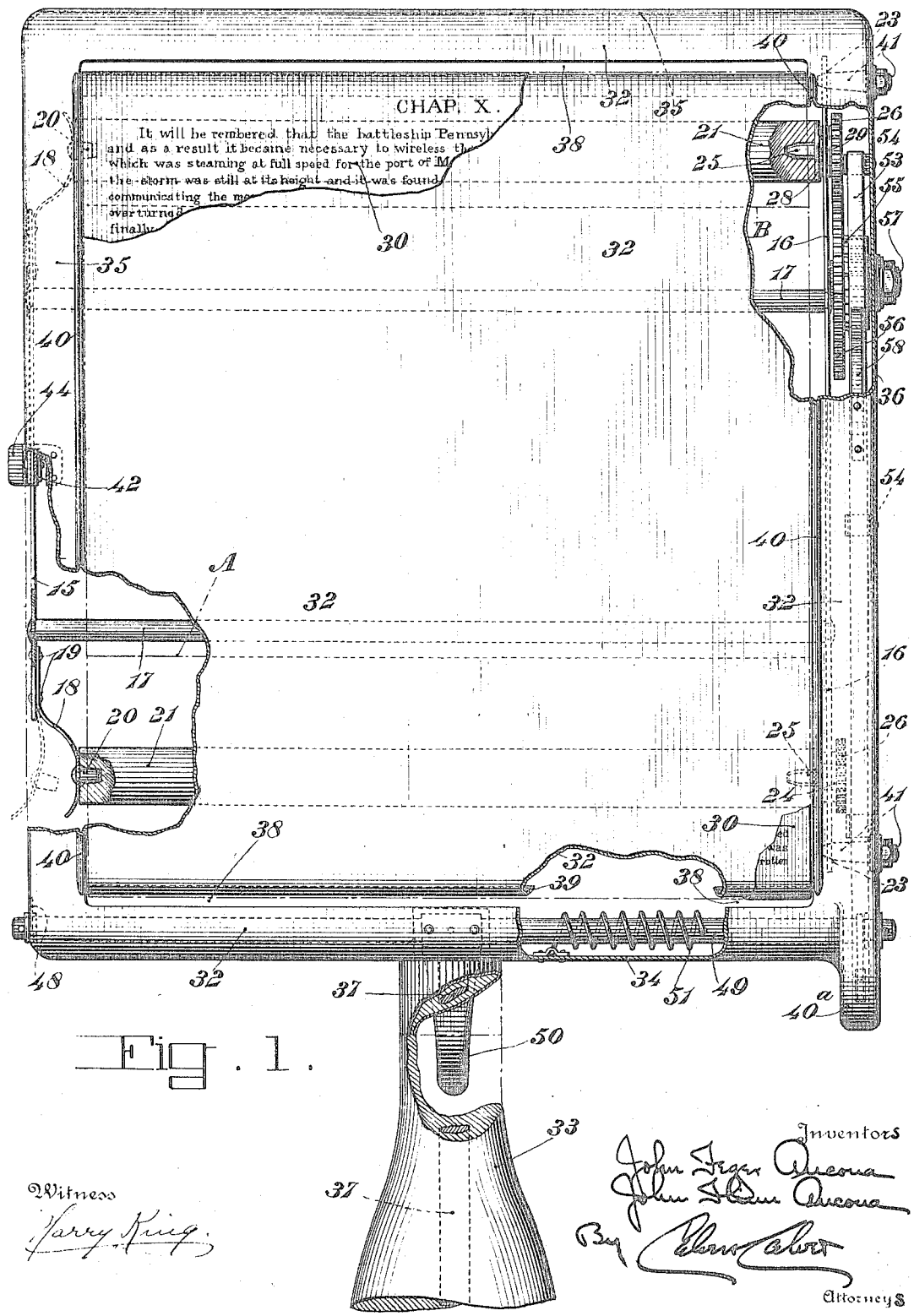

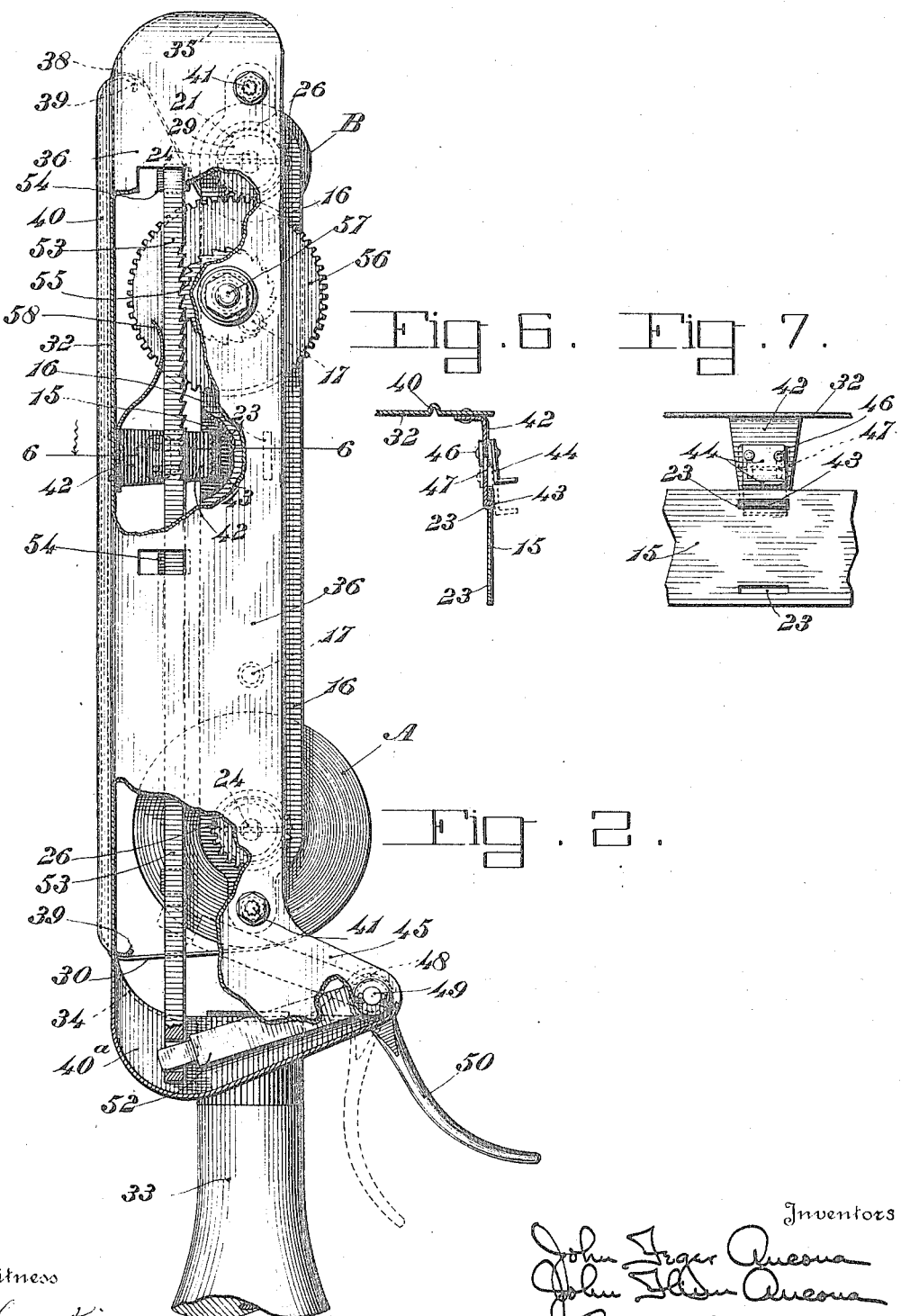

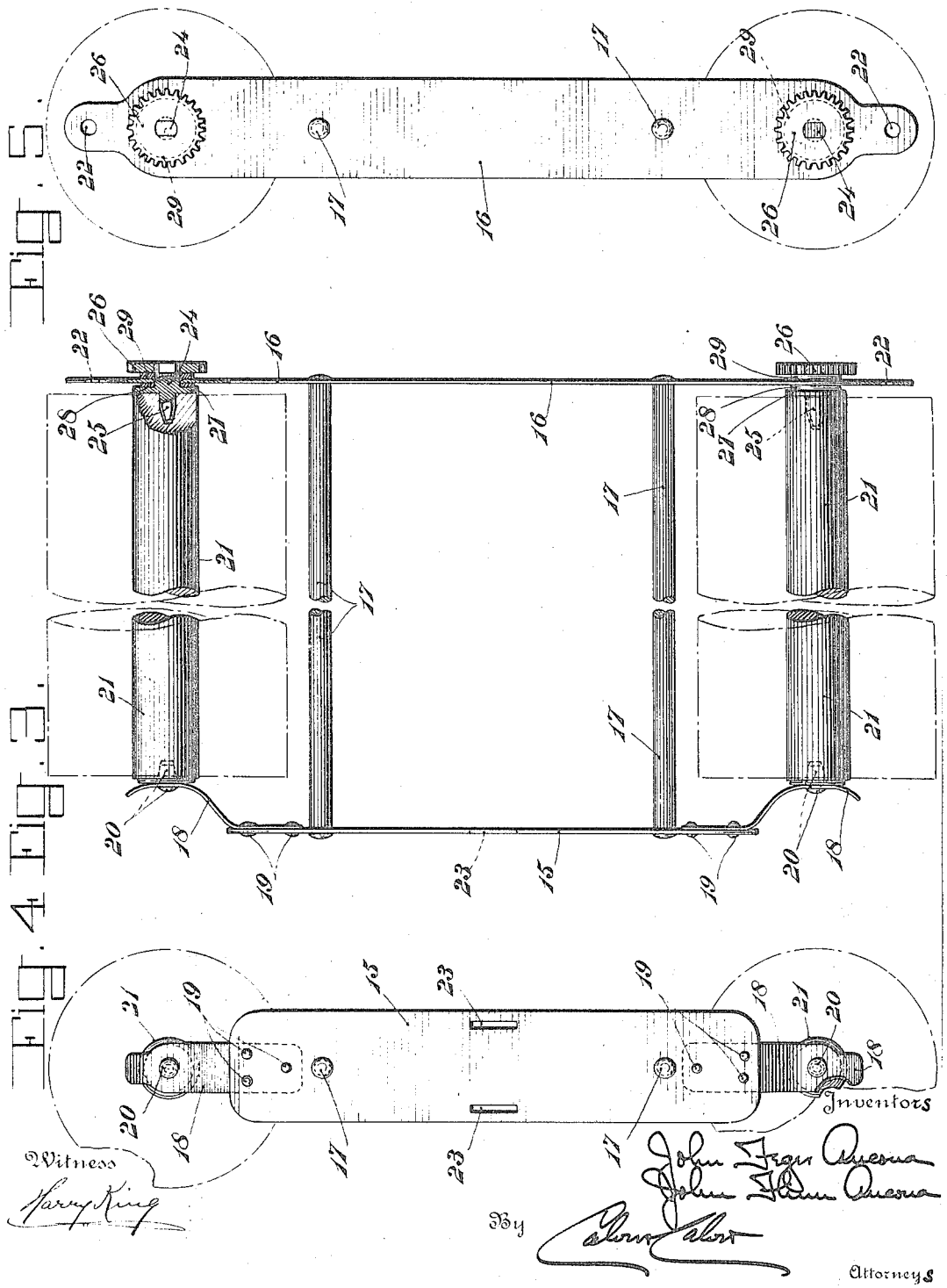

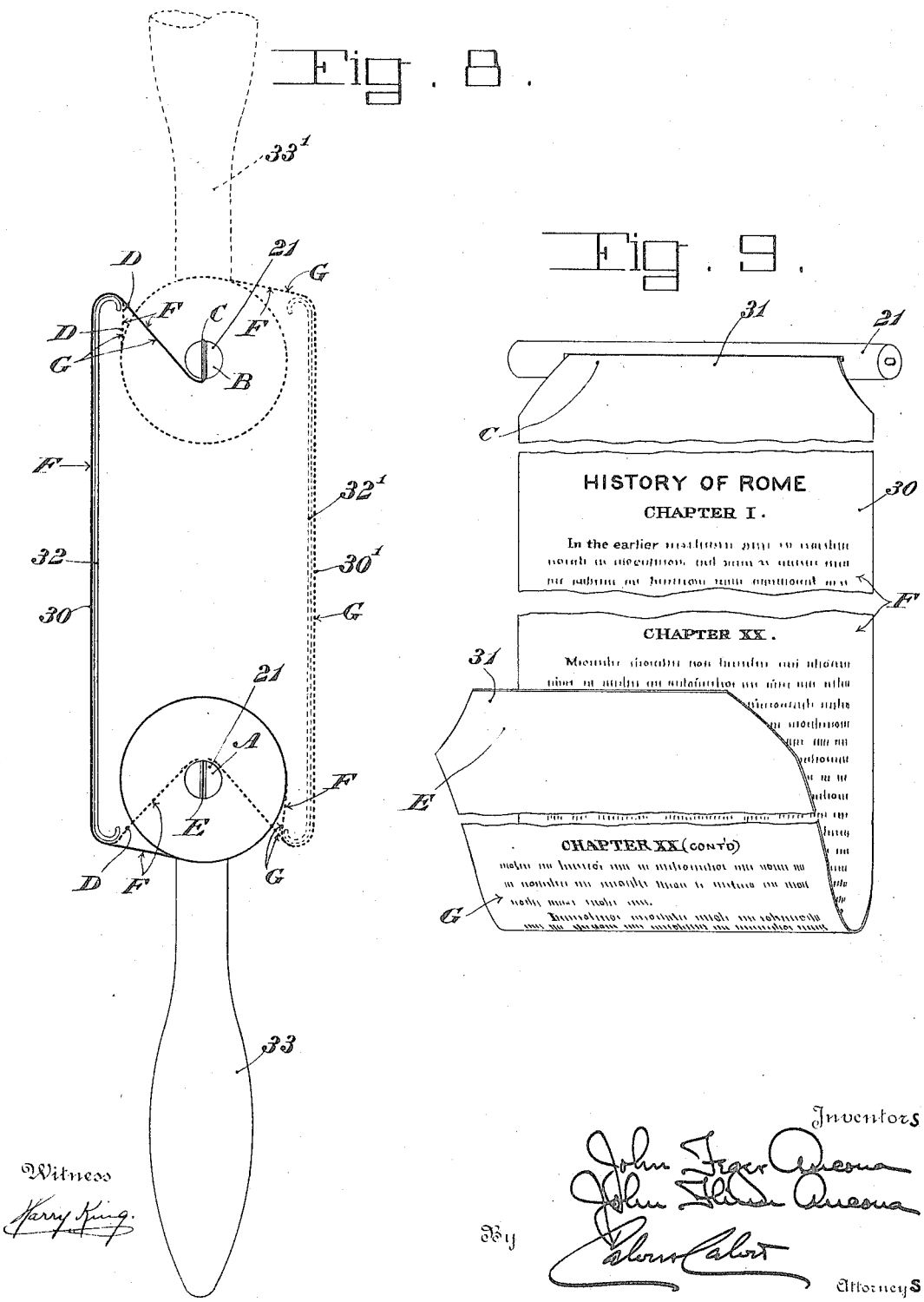

JOHN FEGER ANCONA, OF READING, PENNSYLVANIA, AND JOHN FLINN ANCONA, OF ROCHESTER, NEW YORK.

READING DEVICE.

1,248,780.  Specification of Letters Patent.  Patented Dec. 4, 1917.

Application filed July 15, 1915. Serial No. 40,044.

*To all whom it may concern:*

Be it known that we, JOHN FEGER ANCONA and JOHN FLINN ANCONA, citizens of the United States, residing, respectively, at Reading, in the county of Berks and State of Pennsylvania, and Rochester, in the county of Monroe and State of New York, have invented certain new and useful Improvements in Reading Devices, of which the following is a specification, reference being had to the accompanying drawings.

This invention relates to an improved system of publication, disposition and presentation of reading matter, particularly light fiction and the like, and has for its general objects to reduce the cost of publication, to diminish the bulk of the published work, and to present the matter to the reader in a convenient and attractive form.

These and other more particular objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention may be otherwise embodied and practised without departing from the spirit and scope thereof.

The device herein shown, as to certain of its features, may be considered in the nature of an improvement on or modification of the device described and shown in Letters Patent No. 1,165,219, granted to us December 21, 1915, which contains claims covering subject matter shown and described but not claimed herein.

In said drawings:

Figure 1 is a front elevation and Fig. 2 a side elevation, both partly broken away, of the complete device.

Fig. 3 is a front elevation, partly broken away, of the reversible roller frame.

Figs. 4 and 5 are side elevations of the roller frame as viewed from the left and right, respectively, of Fig. 3.

Fig. 6 is a detail sectional view, taken substantially on the line 6—6, Fig. 2, of the means for retaining the roller frame and handle frame in relative operative position.

Fig. 7 is a detail elevation of the parts shown in Fig. 6.

Fig. 8 is a diagrammatic view illustrating the operation of the device.

Fig. 9 is a detail perspective view, partly broken away, of the reading strip and one of the rollers or spools therefor.

In accordance with the invention the reading matter is printed upon a single continuous strip of paper or other fabric which, for storage purposes and in use, is rolled upon a roller or spool. The lines of reading matter preferably run crosswise of the strip, which is preferably printed on both sides, the reading matter being oppositely disposed on the opposite sides of the strip. In other words, said reading matter may be considered to run downwardly upon one side of the strip and in the opposite direction in the other, so that, in reading, when the lower end of the first side of the strip is reached, said end may be turned upwardly, or the strip as a whole turned end for end and reversed, and the reading matter will continue on the opposite side of the strip the lower end of the first side becoming the upper end of the second side, as illustrated in Fig. 9.

The rolls of reading matter, or the spools or rollers containing the reading strips, are, for presentation to the reader, detachably mounted in a reversible reading frame which, in turn, is detachably mounted in a suitable holder, the strip being gradually reeled off from the spool or roller upon which it is originally stored upon a similar, initially empty spool or roller, whereupon the frame and holder are relatively reversed, the strip gradually reeled back upon the first spool or roller, and the opposite side read.

The term "reading matter" as herein used is, of course, to be understood as broad in its meaning and to include illustrations, diagrams, music, maps or any other similar matter written, printed, drawn, or otherwise inscribed or displayed upon the "reading" strip.

In the construction shown the reversible or roller frame comprises end members 15 and 16 (see particularly Figs. 3 to 5) connected by spacing rods 17 riveted or otherwise secured at their ends to the members 15 and 16.

The member 15 is provided at its ends with resilient extensions or leaf springs 18 formed integral therewith or suitably secured thereto, as by rivets 19. The resilient extensions 18 carry studs or centers 20 which engage suitable centrally located recesses in the ends of the spools or rollers 21, whereby said rollers are rotatably mounted on said studs or centers. Said member 15 is further provided, intermediate its ends and adjacent its opposite edges, with slots or openings 23 for a purpose hereinafter explained.

The end member 16 is preferably of a length somewhat greater than the end member 15 and is provided with a pair of suitably disposed openings in which are rotatably mounted studs or short shafts 24. The studs 24 are provided at their inner ends with centers or dogs 25 which engage suitably formed openings in the ends of the rollers or spools 21 opposite those engaged by the centers 20. The centers 25 are non-circular in cross-section and the openings in the rollers 21 engaged thereby are correspondingly formed, whereby said rollers are coupled to the studs 24 for rotation therewith. Rigidly secured to the outer ends of the studs 24 are pinions 26 whereby said studs may be rotated in the end member 16 by mechanism hereinafter described. Adjacent the centers or dogs 25 the studs 24 are formed with annular flanges 27 between which and the inner face of the member 16 are interposed washers 28 of leather or other frictional material, similar washers 29 being interposed between the pinions 26 and the outer face of the member 16. The washers 28 and 29, by engagement with the opposite faces of the member 16, act frictionally to hold the studs 24 against too free rotation in said end member. The member 16 is further provided at suitable points, preferably adjacent its ends beyond the studs 24, with openings 22 for a purpose which will presently be explained.

The spools or rollers 21 comprise preferably wooden cores provided at their central portions with diametrically arranged slots in which the ends 31 of the reading strip 30 may be inserted and detachably held. To facilitate the attachment of the strip to the rollers said ends 31 are preferably tapered as shown in Fig. 9.

The rollers 21 are inserted into the roller frame by springing the resilient ends 18 of the member 15 outwardly, engaging the centers or dogs 25 with the ends of said rollers, and thereafter releasing the resilient members 18 and permitting said members to move the centers 20 into operative engagement with the opposite ends of said rollers, these operations being reversed in removing the rollers from the frame.

The holder or handle frame (see Figs. 1 and 2) comprises a box-like receptacle provided with a suitable handle 33. Said receptacle comprises a front member 32, end flanges 34 and 35, and one side flange 36, the back and the side of said receptacle opposite the flange 36 being open. The handle 33 is secured to the end flange 34 by means of a suitable bolt 37. The front member 32 constitutes a combined guiding and backing plate for the reading strip as it is fed from one spool to the other, as will presently be more fully explained, said front member being provided adjacent its ends with transverse slots 38 through which said strip passes. The metal of the front member 32 cut out to form the slots 38 is bent inwardly adjacent said slots to form curved lips 39 for guiding and supporting the strip in its passage through the slots. The front member 32 is further formed adjacent its lateral edges with parallel corrugations or ribs 40 extending longitudinally of said member and connecting the ends of the slots 38, said corrugations or ribs serving to guide the edges of the reading strip in its passage between said slots.

The side flange 36 is provided at its inner end, beyond the body of the holder, with a substantially triangular extension 45 which, together with suitably extended and configured portions of the end flange 34 and front member 32, forms a hollow projection 40ᵃ at one inner corner of the handle frame, said projection constituting a housing for certain parts of the operating mechanism hereinafter described.

Projecting inwardly from the flange 36 at suitable points are retaining or positioning pins or studs 41 which coöperate with the openings 22 in the roller frame to position and retain said roller frame in the holder.

Riveted or otherwise secured to the front member 32 at its edge opposite the flange 36 is a bracket 42 having at its edge an outturned lip or flange 43 adapted to engage one or the other of the slots 23 in the roller frame, said bracket 42 being provided with a latch 44 carried by studs 46 which slide in slots 47 in said bracket.

The roller frame is inserted into the holder by engaging the studs 41 in the openings 22 and the flange 43 in one or the other of the slots 23, after which the latch 44 is slid downwardly (as viewed in Figs. 6 and 7) or backwardly (as viewed in Figs. 1 and 2) into engagement with the outer face of the end member 15, thereby retaining said roller frame in position. It will be seen that said roller frame may be placed in or connected with said holder with either end of said roller frame up (as viewed in Figs. 1 and 2 in which the handle 33 is shown at the bottom of the device, this being the normal reading position), and with the front member or guiding plate 32 of the holder adjacent either side of the roller frame according to which of the slots 23 is engaged by the flange 43 on the bracket 42. It will also be seen that the roller frame and holder may be readily disconnected by releasing the latch 44 and disengaging the flange 43 from the slot 23 and the studs 41 from the openings 22, and that said parts when so disconnected may be relatively reversed and reconnected in reversed operation, by engaging the flange 43 with the other slot 23, when required in the operation of the device, as hereinafter explained.

For rotating the rollers or spools 21 in order to feed the reading strip 31 from one to the other over the front member or guiding plate 32, the following mechanism is provided: Journaled in the rear end of the extension 45 and in an ear 48 on the end of the flange 34 opposite the housing 40ª is a shaft 49 provided with a trigger or finger piece 50. Said trigger or finger piece 50 is located substantially centrally of the shaft 49 in a position to be readily operable by the forefinger of a hand grasping the handle 33. The shaft 49 and the parts connected therewith are normally held in the position shown in full lines in Fig. 2 by means of a torsional spring 51 secured at one end to said shaft and at the other to the flange 34. Fast upon the shaft 49 adjacent its end, and operating in the housing 40ª, is an arm 52 engaging at its forward end an opening in an operating rod or bar 53 guided for longitudinal movement in guides 54 which preferably comprise integral hooked lugs formed by punching out and bending inwardly portions of the metal of the flange 36. The rod or bar 53 is provided adjacent its upper end with ratchet rack teeth which coöperate with a ratchet pinion 55 carried by a gear 56 rotatably mounted on a stud 57 projecting inwardly from the flange 36. The gear 56 is so located as to mesh with the upper pinion 26 when the roller frame is in position in the holder. The bar 53 is pressed rearwardly, and thereby held in operative engagement with the ratchet pinion 55, by means of a leaf spring 58 riveted or otherwise secured at one end to the front member 32 and having its free end in engagement with said bar or rod.

When the finger piece 50 is moved from the position shown in full lines in Fig. 2 to the position shown in dotted lines in said figure the shaft 49 is rocked in a clockwise direction against the tension of the spring 51, swinging the arm 52 upwardly and moving the bar 53 upwardly in its guides 54. As the bar 53 moves upwardly engagement of the teeth thereon with the ratchet pinion 55 causes said pinion to be rotated in a clockwise direction, carrying with it the gear 56 which, by engagement with the pinion 26 of the upper roller, causes said roller to be rotated in a counter-clockwise direction. When the finger piece 50 is released the spring 51 causes the parts to return to the position shown in full lines in Fig. 2, the bar 53 being moved downwardly. During this movement the rack teeth on said bar move idly over the pinion 55, the spring 58 yielding to permit lateral movement of said bar forwardly away from said pinion, and the guides 54 being open at their forward sides or otherwise formed to permit such lateral movement of the bar 53. The upper pinion 26 (which has been turned by the upward movement of the bar 53, as above explained) the gear 56, and the pinion 55 are held against accidental retrograde movement during the downward movement of the bar 53 by the friction washers 28 and 29, although, if desired, a holding pawl of any usual or well known form may be provided for the ratchet pinion 55.

The complete operation of the device is as follows:

To prepare the device for use, a roll of strip 30 upon a spool or roller 21 is placed in position between one pair of centers 20 and 25 of the roller frame as above described, and an empty roller or spool is similarly placed in position between the other centers of said frame. The roller frame is then connected with the holder, as above explained, in such a position as to bring the full spool or roller at the lower end of said holder, or adjacent the handle 33. In Figs. 2 and 8 this spool or roller is designated by the letter A, the empty spool or roller being designated by the letter B. In accordance with the preferred arrangement (which, however, is susceptible of considerable variation) the roll of reading strip is initially so disposed upon the spool A that the end C (see Figs. 8 and 9) thereof at which the reading matter commences is the free end of the roll, while the side F of said strip, upon which said reading matter commences, is faced outwardly. Said end C is passed outwardly or forwardly through the lower slot 28, upwardly across the guiding plate 23 with the side F outward or forward, and inwardly through the upper slot 38, and is connected with the roller B by being passed through the diametrically disposed slot in said roller. The parts will then be in the position shown in Fig. 2 and in full lines in Fig. 8 and the device ready for reading.

In the operation of reading, the finger piece 50 is repeatedly operated, or drawn toward the handle 33 and released, causing the roller B to be gradually turned in a counter-clockwise direction, the gear 56 being at this time in engagement with the pinion 26 corresponding to said roller B. Turning of the roller B causes the reading strip 30 to move upwardly over the guiding plate 32, where it may be conveniently read during its passage, said strip being gradually unwound from the roller A and gradually wound up upon the roller B until said strip occupies the position indicated by the dotted line D at the left in Fig. 8. During this operation the side F of the strip has been read. The end E of said reading strip is then disengaged from the roller A, and withdrawn from the slots 38. The roller frame and holder are thereupon relatively reversed, as above explained, bringing the parts into the relative position shown in dotted lines in Fig. 8, the roller B being brought to the end of the holder adjacent the handle, and the guiding plate 32 being brought to the opposite side of the roller or reading frame, the new position of the handle and guiding plate being indicated by the numerals 33′ and 32′, respectively, in said figure. This relative reversal of the roller frame and holder causes the gear 56 to be disengaged from the pinion 26 corresponding to the roller B and engaged with the pinion 26 corresponding to the roller A. It will, of course, be understood that the entire apparatus is at this time reversed from the position shown in dotted lines in Fig. 8 to bring the handle 33′ to the bottom and into the position of the handle 33 as shown in said figure. The end E of the reading strip, which is now the free end, is then passed outwardly or forwardly through the lower slot 38, is again carried upwardly across the guiding plate and through the upper slot 38, and is reëngaged with the roller A, the strip then occupying the position indicated by the numeral 30′ in Fig. 8. This brings the side G of the reading strip outward or to the front and in a position to be read. The operating mechanism is again manipulated as above described, causing the strip to be gradually re-reeled upon the roller A until the end C thereof is reached, said strip being then in its initial condition upon the roller A and ready for another reading.

Having thus described our invention, we claim:

1. A reading device comprising a roller frame, rollers in said frame for holding and feeding a reading strip, a box-like receptacle for said frame, said receptacle having a front member constituting a guiding plate for said strip, closed ends and one closed side, the opposite side and back of said receptacle being open, and means for detachably retaining said frame in said receptacle.

2. A reading device comprising a frame having a side member provided with an opening, means in said frame for holding and feeding a reading strip, a holder for said frame, means on said holder for engaging said opening for positioning said frame in said holder, and a latch adapted to engage said side member for detachably retaining said frame in said holder.

3. A reading device comprising a roller frame having a side member provided with a slot, rollers in said frame for holding and feeding a reading strip, a box-like receptacle for said frame, said receptacle having a front member constituting a guiding plate for said strip, closed ends and one closed side, the opposite side and back of said receptacle being open, a bracket on the front member of said holder adjacent the open side thereof and provided with a lip adapted to engage the slot in the side member of said roller frame, and a latch on said bracket adapted to engage said side member for detachably retaining said frame in said holder.

4. A reading device comprising a reversible frame having a side member provided with a pair of slots, means in said frame for holding and feeding a reading strip, a holder for said frame, means on said holder for engaging either of said slots in accordance with the position of said frame in said holder, and a latch adapted to engage said side member for detachably retaining said frame in said holder.

5. A reading device comprising a frame having a side member provided with one or more openings, means in said frame for holding and feeding a reading strip, a holder for said frame provided with one or more retaining and positioning pins adapted to engage the opening or openings in said side member, and means for detachably connecting said frame and holder to retain said frame in engagement with said pin or pins.

6. A reading device comprising a frame having two side members, one of said side members being provided with a slot and the other of said side members being provided with one or more openings, means in said frame for holding and feeding a reading strip, a holder for said frame provided with one or more retaining and positioning pins adapted to engage said opening or openings, a bracket on said holder provided with a lip adapted to engage said slot, and a latch on said bracket for retaining said lip in said slot.

7. In a reading device, in combination, a holder provided with a handle, means in said holder for feeding a reading strip, a trigger arranged adjacent said handle, and mechanism operated by said trigger for actuating said strip feeding means.

8. A reading device comprising a frame, means in said frame for holding and feeding a reading strip a holder for said frame provided with a handle, means for detachably connecting said frame and holder, operating mechanism for said rollers carried by said holder, and a trigger arranged adjacent said handle for actuating said mechanism.

9. In a reading device, in combination, a holder provided with a handle, means in said holder for feeding a reading strip, a shaft journaled in said holder, mechanism operated by said shaft for actuating said strip feeding means, a spring for turning said shaft in one direction, and a trigger secured to said shaft and arranged adjacent said handle for turning said shaft in opposition to said spring.

10. In a reading device, in combination, a holder provided with a handle, means in said holder for feeding a reading strip, a rock shaft journaled in said holder, an operating bar or rod for said strip feeding means provided with an opening, an arm on said rock shaft loosely engaging said opening, a spring for turning said rock shaft in one direction, and a trigger secured to said rock shaft and arranged adjacent said handle for turning said rock shaft in opposition to said spring.

11. In a device of the character described, mechanism for holding and feeding a reading strip comprising a roller, a pinion connected with said roller, an operating gear meshing with said pinion, a ratchet pinion carried by said gear, a reciprocating rack bar provided with ratchet teeth coöperating with said ratchet pinion, said rack bar having an opening, a rock shaft, means for operating said rock shaft, and an arm on said rock shaft loosely engaging the opening in said rod.

12. In a device of the character described, mechanism for holding and feeding a reading strip comprising a roller, a pinion connected with said roller, an operating gear meshing with said pinion, a ratchet pinion carried by said gear, a longitudinally reciprocating rack bar provided with ratchet teeth coöperating with said ratchet pinion, a spring for holding said rack bar in engagement with said pinion, and guides for said rack bar constructed and arranged to permit said bar to move into and out of engagement with said ratchet pinion.

13. In a device of the character described, mechanism for holding and feeding a reading strip comprising a pair of rollers, pinions connected with said rollers respectively, an operating gear adapted to mesh with said pinions alternatively, a ratchet pinion carried by said gear, and a reciprocating rack bar provided with ratchet teeth coöperating with said ratchet pinion.

In testimony whereof we affix our signatures.

JOHN FEGER ANCONA.
JOHN FLINN ANCONA.